United States Patent [19]

Chu et al.

[11] 4,138,720

[45] Feb. 6, 1979

[54] TIME-SHARED, MULTI-PHASE MEMORY ACCESSING SYSTEM

[75] Inventors: Ke-Chiang Chu, San Jose; Richard S. Sharp, Santa Barbara, both of Calif.

[73] Assignee: Burroughs Corporation, Detroit, Mich.

[21] Appl. No.: 784,352

[22] Filed: Apr. 4, 1977

[51] Int. Cl.² ........................................... G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,238,510 | 3/1966 | Ergott, Jr. | 364/200 |
| 3,781,812 | 12/1973 | Wymore et al. | 364/200 |
| 3,931,613 | 1/1976 | Gruner et al. | 364/200 |
| 4,028,668 | 6/1977 | Riikonen | 364/200 |

*Primary Examiner*—Raulfe B. Zache
*Attorney, Agent, or Firm*—Nathan Cass; Kevin R. Peterson; Edward J. Feeney, Jr.

[57] ABSTRACT

A bit addressable, variable field memory system partitioned into a plurality of individually addressable memory stacks and employing time-shared accessing circuitry in conjunction with the use of serial, multi-phase accessing of the memory stacks, whereby the advantages of serial memory stack accessing are achieved without significantly increasing the overall memory accessing time over that obtained for parallel accessing.

15 Claims, 6 Drawing Figures

TIME-SHARED, MULTI-PHASE MEMORY ACCESSING SYSTEM

CROSS-REFERENCE TO RELATED APPLICATIONS

The commonly assigned U.S. Pat. No. 3,781,812 entitled Addressing System Responsive to a Transfer Vector for Accessing a Memory by C. E. Wymore et al. discloses an addressing system over which the present invention is an improvement.

The commonly assigned U.S. Pat. No. 3,739,352 entitled Variable Word Width Processor Control by R. E. Packard discloses a data processing system in which the present invention may be incorporated.

The disclosures of the above identified patents are to be considered as incorporated herein.

BACKGROUND OF THE PRESENT INVENTION

The present invention is directed to improved means and methods for transferring data to and from a random access memory of the type disclosed in the aforementioned patents.

Random access memories are well known in the computer art. Such memories can be constructed from many different types of bit storing devices, such as magnetic and semiconductor elements and the like. By random access is meant that the elements are grouped together into locations and that data items can be written into or read from any group of elements or cells forming one location in approximately the same time as from any other location.

In early computer systems the data to be processed was usually grouped into words having a field length equal to the number of elements or cells per location in the system memory. As the range of problems presented to data processing systems expanded, the types of formats used to represent data items have multiplied. Thus, the memory has been required to store fields of data which may have variable field lengths shorter than or longer than the number of cells in a location. Also, in order to use the available storage capacity of the memory efficiently, it has become necessary to be able to specify not only a specific location in the memory, but also to specify particular cells within a selected memory location.

In the cross-reference U.S. Pat. No. 3,781,812, an advantageous memory addressing system is disclosed which provides variable field length and bit addressing capabilities, and also permits memory cells to be accessed on either side of a designated boundary. A bit addressable, variable field memory system of the type disclosed in this patent is currently employed in Burroughs B 1700 computer systems.

In the preferred embodiment disclosed in the cross-referenced U.S. Pat. No. 3,781,812, the memory is partitioned into a plurality of independently operating modules. Fields of data bits can be stored in one or more modules, that is, partly in one module and partly in other modules. Each module is coupled to its own access control circuitry and, during a particular access operation, data is simultaneously transferred in parallel to or from one or more modules as determined by field length and direction indicating portions of the applied addressing information. Rotation and masking circuitry responsive to starting bit and field length information serve to rotate and mask the transferred data so that it is compatible with the memory and processor formats being employed and so that unwanted data outside of the desired field is inhibited.

SUMMARY OF THE PRESENT INVENTION

The present invention is broadly directed to providing improved means and methods for transferring data to and from bit addressable, variable field memories of the type disclosed in the aforementioned U.S. Pat. No. 3,781,812.

More specifically, the present invention provides improved means and methods for reducing the circuitry required for transferring a variable field of data to or from a bit addressable, variable field memory without significantly increasing the time required for access. This is accomplished in a preferred embodiment of the invention by providing a time-shared, multi-phase memory accessing system which permits the memory modules to time-share addressing and output circuitry while also permitting a significant reduction to be made in the bit width requirements of these circuits.

The specific nature of the invention as well as other objects, advantages and uses thereof will become evident from the following description of a preferred embodiment taken in conjunction with the accompanying drawings.

BRIEF DESCRIPTION OF THE DRAWINGS

FIG. A is an overall block diagram of a data processing system in which the present invention may be incorporated.

DETAILED DESCRIPTION

Introduction:

Like numerals refer to like elements throughout the drawings.

Initially, it is to be noted that the present invention will be illustrated by describing how the present invention may be embodied in a bit addressable variable field memory and addressing system of the type disclosed in the cross-reference U.S. Pat. No. 3,781,812. However, it is to be understood that this is being done merely for illustrative purposes, and that the features of the invention are also applicable to a wide variety of other types of systems. Accordingly, the particular embodiments described herein should not be considered as limiting the scope of the present invention.

DESCRIPTION OF PREFERRED EMBODIMENT OF U.S. Pat. No. 3,781,812 (FIGS. A and 1)

Referring first to FIG. A, illustrated therein in a block diagram of the major components of a prior art data processing system in which the present invention may be incorporated. A like FIG. A is included in the cross-reference U.S. Pat. No. 3,781,812. A memory and memory addressing system 3 includes a main memory 10 which stores information for a plurality of requesting units 1 such as, for example, a data processor 1-0 and an input/output multiplexor 1-n. Data processor 1-0 may be of the type described in U.S. Pat. No. 3,739,352 cross-reference above. The requesting devices 1 are coupled to the main memory 10 through port switching circuitry 2 and memory communications control 4. Port switching exchange 2 comprises conventional circuitry for providing a communications path between any selected one of the requesting units 1 and memory 10.

Each of the requesting units 1 provides address information to port switching circuitry 2 which gates the address information to memory and memory addressing system 3. The requesting units also provide information to be written into memory 10 during write requests and accept information read out of memory 10 during read requests.

Figure 1:
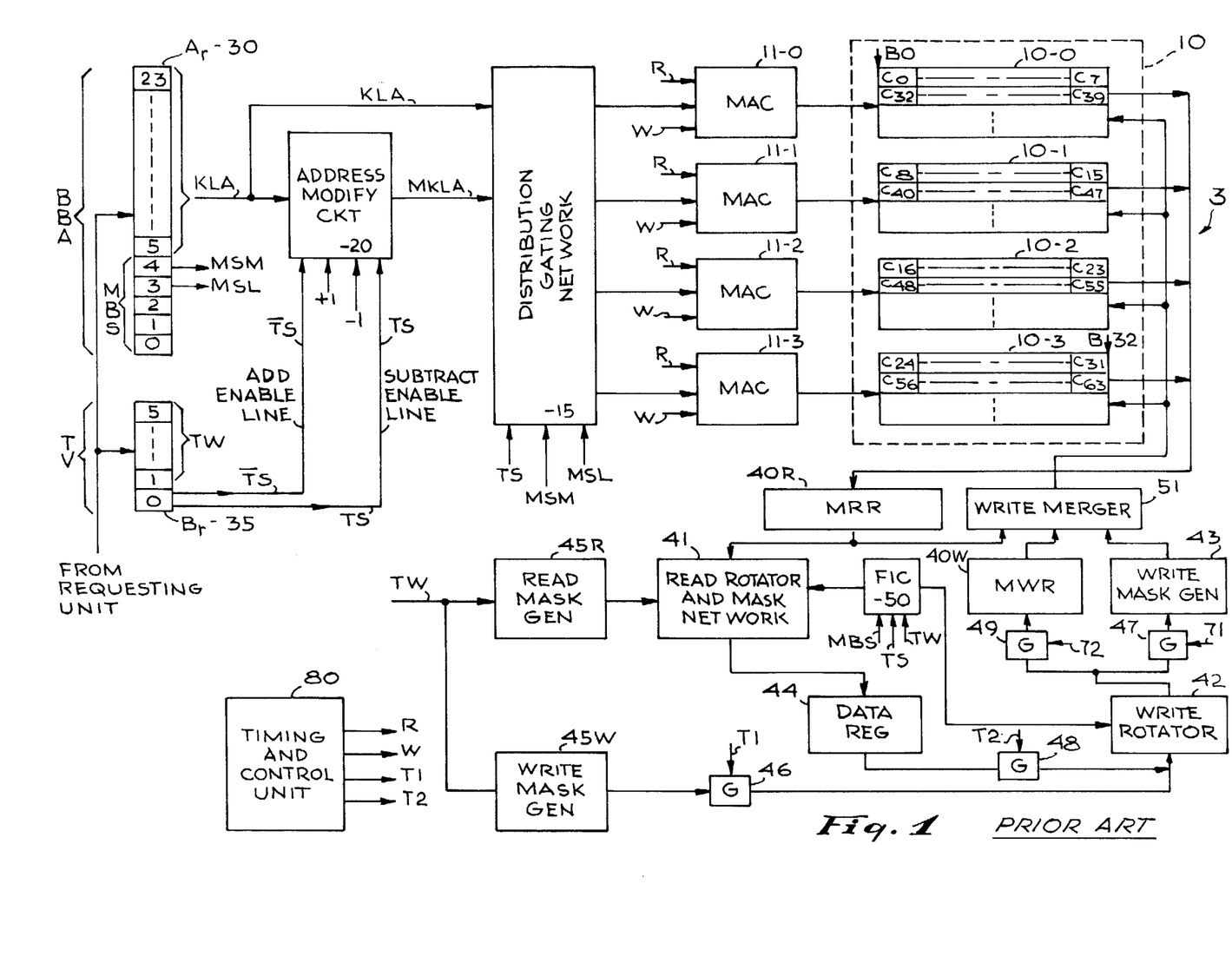
FIG. 1 is a block diagram of a preferred embodiment of the memory and addressing system disclosed in cross-referenced U.S. Pat. No. 3,781,812.

Referring next to FIG. 1, illustrated therein is a block diagram of the preferred embodiment of the bit-addressable, variable field memory and memory addressing system disclosed in the cross-referenced U.S. Pat. No. 3,781,812, a like FIG. 1 also appearing therein. As shown, memory 10 is partitioned into four modules 10-0 through 10-3. Each module is a conventional random access memory and can be constructed from many different types of memory elements, such as magnetic cores, thin films, semiconductors or the like. FIG. 1 shows that each module is partitioned into addressable locations, each location, for example, having either cells in a row, such as cells $C_0$-$C_7$ in module 10-0. Information is read from or written into a module one location (i.e., a row of eight cells in parallel) at a time. In this regard it should be recognized that, as is well known, the cells in an addressable memory need not be and generally are not spacially arranged contiguously in rows. By the same token, the spacial relationship between locations is of no particular significance. Accordingly, reference made herein to memory cell locations are directed to the addressability of the locations.

Each module in FIG. 1 is coupled to its own memory access control circuit (MAC). The MACs are referenced in FIG. 1 as 11-0 through 11-3. Each MAC is responsive to an absolute address signal to select a location in the module to which it is coupled and cause data bits to be transferred between the cells in the selected location and a memory read 40R. The particular one or more MACs involved in a data transfer is determined by field length and direction information included in the applied address information, the data transferred to or from the selected modules being simultaneously transferred in parallel between the selected modules and the read and write information registers 40R and 40W. The read and write registers 40R and 40W may each typically have 32 flip-flops to accommodate data with respect to four memory locations, one location of eight bits for each module. The transfer of data can be in either direction. That is, each MAC responds to a read control signal on its R input to read data from the selected location for transfer to the read register 40R, and each MAC responds to a write control signal to transfer data in the write register 40W for writing into the selected location. The source of the read and write control signals is a conventional control and timing unit shown as block 80.

Although not limited thereto, in the preferred embodiment of the cross-referenced U.S. Pat. No. 3,781,812, the read operation is non-destructive. Briefly, the read operation proceeds as follows: one of the requesting units 1 of FIG. A provides address information and the memory modules of memory 10 are accessed by MAC11-0 through MAC11-3 and up to 32 data bits are read out and loaded into the 32 flip-flops of the read register 40R. Data stored in the read register 40R is next transferred to a data register 44 through a read rotator and masking net work 41. Finally, the data stored in data register 44 is coupled by means not shown back to the requesting unit 1. Read rotator and masking network 41 serves to isolate a desired field from the 32 bits stored in the read register 40R and also to rotate the desired field into a desired position in the data register 44. A field isolation control unit FIC50 controls the number of digit places by which the data is rotated, and a read mask generator 45R controls the masking function. Data register 44 may typically comprise 24 flip-flops.

The write operation in the preferred embodiment of the cross-referenced U.S. Pat. No. 3,781,812 involves a non-destructive read phase, a modifying phase, and a restore phase. The purpose of this read/modify/restore cycle is to enable the writing of bits of data into some of the cells in a selected location without changing the contents of other cells in the selected locations. Briefly, the write operation proceeds as follows: new data which is to be written into memory 10 is stored in the data register 44. The source which supplies this data is not shown in FIG. 1; it could be any data source within one of the requesting units 1 (FIG. A) of the data processing system. Old data which is in memory 10 is read out and transferred into the read register 40R. The new data is transferred into the write register 40W via gates 48 and 49 and a write rotator 42 which rotates the new data as determined by FIC50. Write merger 51 merges the outputs of the read and write registers 40R and 40W under the control of write mask register 43, whose masking is in turn determined by a write mask generator 45W. The output of the write merger register 51 is next written into the respective memory modules of memory 10 as determined by the applied addressing information.

Each MAC in FIG. 1 is coupled to an address distribution gating network 15 to receive therefrom absolute addressing signals which in turn are derived from input addressing information contained in A register 30 and B register 35, which taken collectively constitute an address code. As indicated in FIG. 1, the address code comprises a bit boundary address field BBA which specifies a boundary between any arbitrary two cells in the memory, a transfer sign field TS which specifies one of either side of the specified boundary, and a transfer width field TW which specifies any one of a variable number of cells up to 24 which are to be involved in a data transfer. An MBS portion of BBA determines the starting cell location for the transferred data, and MSM and MSL determine the particular module which contains the starting cell location. An addressing modifying circuit 20 in FIG. 1 typically comprises a conventional binary add/subtract circuit which operates in response to the transfer sign field TS to appropriately modify the address applied to the gating network 15 so as to permit addressing of module cells in either a positive or negative direction with respect to the starting cell location.

As shown in FIG. 1 the transfer width field TW is applied in parallel to both the read and write mask generators 45R and 45W for generating the appropriate mask required for each data transfer. The transfer field TW is also applied to the field isolation control unit FIC50 along with the transfer sign field TS and the MBS portion of the bit boundary address field BBA so that FIC50 can provide appropriate signals to the read and write rotators 41 and 42 for rotating the transferred data by the amount required for desired justification desired.

More specific details with regard to the construction and operation of the preferred embodiment disclosed in the cross-referenced U.S. Pat. No. 3,781,812 can be obtained by reference thereto, this patent also including examples of preferred detailed embodiments of gating network 15, rotators 41 and 42, field isolation control 50 and write merger 51 shown generally in FIG. 1.

DESCRIPTION OF THE PRESENT INVENTION (FIGS. 2–8)

The present invention will now be described by illustrating how it may be applied to a bit addressable, variable field memory of the same general type as disclosed in the preferred embodiment of the cross-referenced U.S. Pat. No. 3,781,812 described above. As mentioned previously, the choice of such an embodiment for illustrative purposes should not be considered as limiting the scope of the present invention.

Accordingly, with the above description of the preferred embodiment of the cross-referenced U.S. Pat. No. 3,781,812 as background, attention is now directed to FIG. 2 which illustrates how the present invention may be implemented. Reference is directed to this cross-referenced U.S. Pat. No. 3,781,812 for more detailed information as to how like elements may typically be provided.

Figure 2:
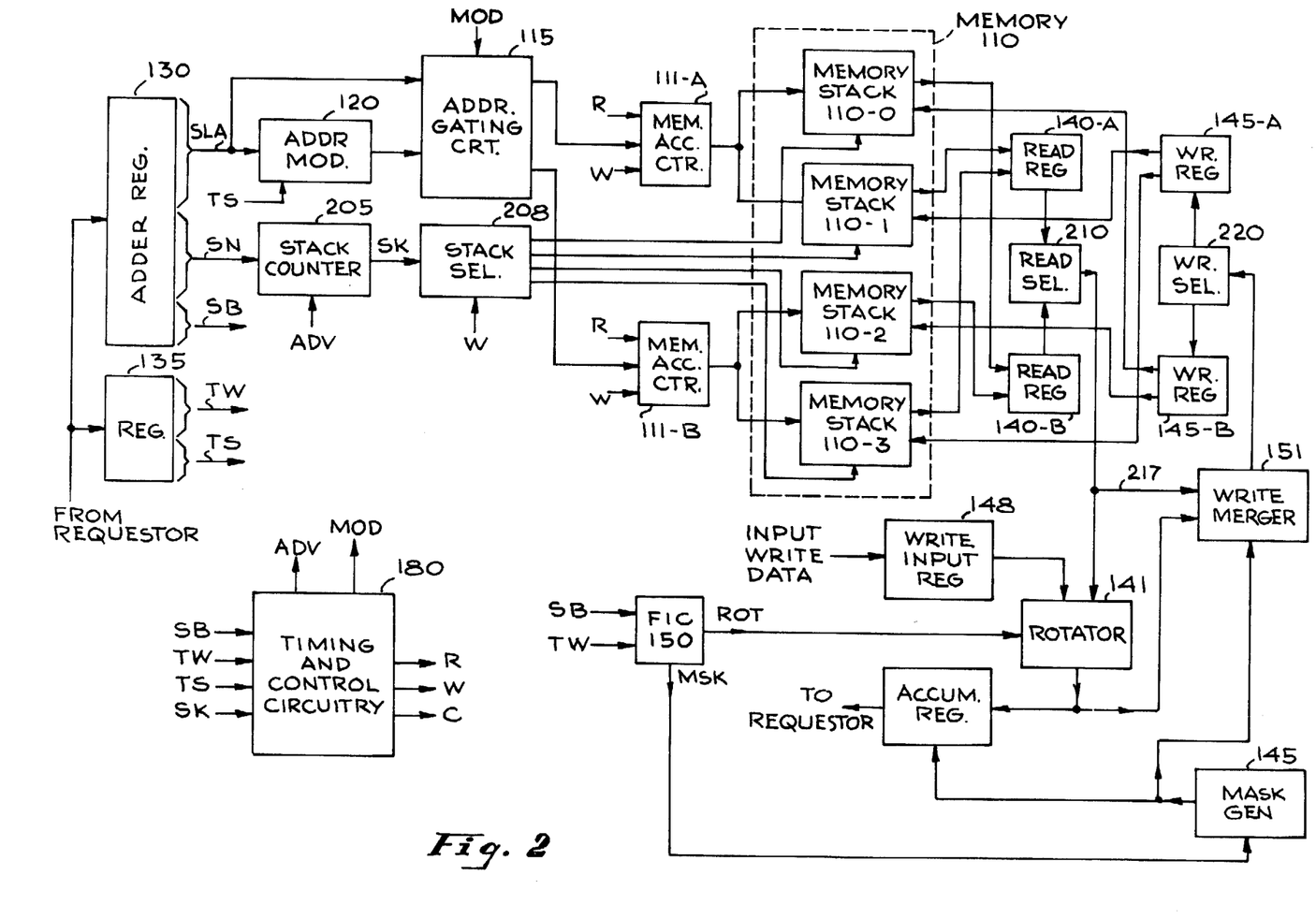
FIG. 2 is a block diagram of an improved memory accessing means in accordance with the present invention.

As shown in FIG. 2, a memory 110 is typically partitioned into four separate parts, each part hereinafter being referred to as a stack. The four stacks are designated as 110-0, 110-1, 110-2 and 110-3. Stacks 110-0 and 110-1 are addressed by a common memory access control 111-A, while stacks 110-2 and 110-3 are addressed by a common memory access control 111-B. A memory address register 130 applies a stack location address SLA to the memory access controls 111-A and 111-B via an optionally operable address modifier 120 and address gating circuitry 115, whereby to provide for accessing a selected location in each of one or more of the stacks 110-0 to 110-3, each location containing a plurality of memory cells.

Figure 3:
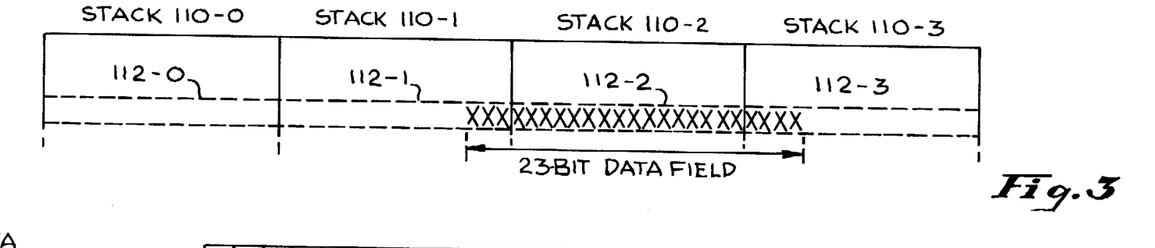
FIG. 3 is a schematic representation illustrating a typical example of how a data field may be stored in the memory 110 of FIG. 2.

FIG. 3 illustrates a typical example of how a 23-bit data field may be stored in the cells of three memory locations 112-1, 112-2 and 112-3 of stacks 110-1, 110-2 and 110-3, respectively, having a common stack location address SLA. For the purpose of this example, it is assumed that each memory location comprises 16 cells capable of storing 16 data bits. Each memory location may also include six additional cells for storing a 6-bit check code, the details of which are not pertinent to the present invention. An X in FIG. 3 indicates a cell storing a data bit of the desired 23-bit data field.

It will thus be understood that an address set up in address register 130 in FIG. 2 provides for addressing of the illustrative memory locations 112-0, 112-1, 112-2 and 112-3 shown in FIG. 3 by applying a common stack location address SLA, via address gating circuitry 115, to both of the memory access controls 111-A and 111-B. Memory access control 111-A serves to access memory locations 112-0 and 112-1 in stacks 110-0 and 110-1, respectively, and memory access control 111-B serves to access memory locations 112-2 and 112-3 in stacks 110-2 and 110-3, respectively. As pointed out earlier herein, accessing of the memory stacks is performed in accordance with the present invention in a particularly advantageous multi-phased, time-shared manner, rather than being simultaneously accessed in parallel as disclosed in the cross-referenced U.S. Pat. No. 3,781,812.

Figure 4:
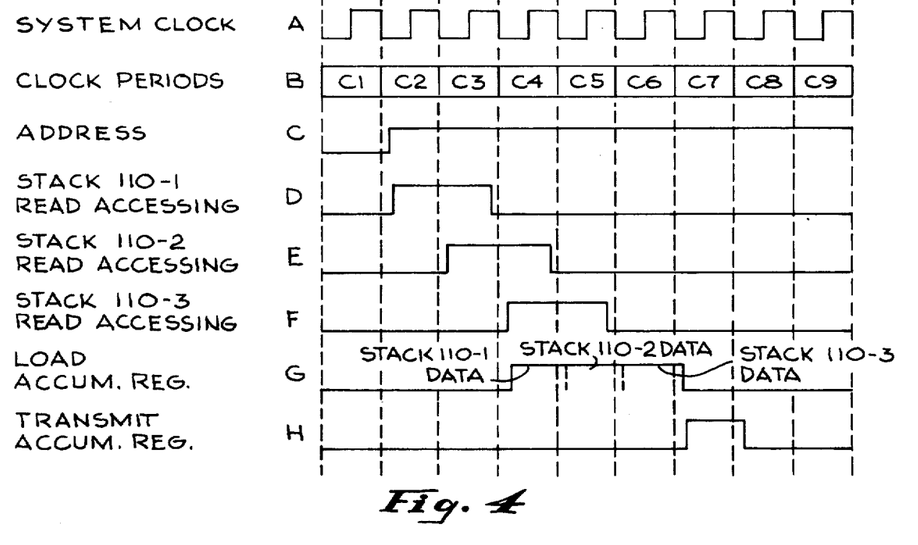
FIG. 4 is a series of timing graphs illustrating a typical read cycle performable by the embodiment of the invention shown in FIG. 2.

Reference is now directed to the graphs of FIG. 4 for consideration along with FIGS. 2 and 3. The graphs of FIG. 4 illustrate a typical read cycle performed by the embodiment of FIG. 2 for reading out the illustrative data field of FIG. 3 from stacks 110-1, 110-2 and 110-3. A typical system clock is illustrated by graph A of FIG. 4. Graph B illustrates the clock periods C1, C2, etc. occurring during the illustrated read cycle.

As indicated by graph C of FIG. 4, during the initial portion of clock period C1, a stack location address SLA is transferred from address register 130 to memory access controls 111-A and 111-B. For the illustrative 23-bit data field shown in FIG. 3, the stack location address SLA is assumed to correspond to location 112 in each stack. The address in address register 130 also includes a starting stack number SN which sets a stack counter 205 to an initial count SK. This initial count SK is in turn applied to a stack selector 208 for activating during clock period C3 only the stack corresponding thereto. For the example of FIG. 3 the stack number SN sets the stack counter 205 to a count corresponding to stack 110-1, since the desired data field begins in location 112-1 of stack 110-1.

As illustrated in graph D of FIG. 4, the accessing of stack 110-1 for a read operation begins in clock period C1 in response to a read signal R from timing and control circuitry 180 after the above described addressing illustrated in graph C is completed. In this regard, it is to be understood that appropriate control and timing signals for controlling the components of FIG. 2 in order to perform the operations being described herein, such as read signal R, can readily be provided by timing and control circuitry 180 in FIG. 2, which is generally analogous to the prior art timing and control unit 80 of the cross-referenced U.S. Pat. No. 3,781,812 shown in FIG. 1, and can likewise be provided in a conventional manner.

It is to be noted in FIG. 2 that the input information provided for a memory access not only includes the previously considered stack location address SLA and the stack number SN, but also includes (similarly to the preferred embodiment of the cross-referenced U.S. Pat. No. 3,781,812) information designating a starting bit SB stored in address register 130, and a transfer width TW and a transfer sign TS typically stored in another register 135. The SB output of register 130 and the TW and TS outputs of register 135 are applied to timing and control circuitry 180 for use in generating the control and timing signals provided thereby. SB and TW are also applied to field isolation circuitry FIC150 for controlling masking and rotation and TS is applied to address modifier 120 for use when address modification is required. The functions of SB, TW and TS in the embodiment of the present invention of FIG. 2 are basically similar to those disclosed in the cross-referenced U.S. Pat. No. 3,781,812.

Returning to the typical read cycle illustrated in FIG. 4, operations occurring during clock period C2 will now be considered. Initially, it is to be understood that because the time required to access a random access memory is typically relatively long as compared to the time required for performing logical operations during a cycle of a data processing system, it is to be expected that the portion of the data field in location 112-1 of stack 110-1 accessed during clock period C1 will not be available at the stack output for several cycles. In the example being considered, it will be assumed that data addressed for reading from a stack during a clock period will not be available for use until three clock periods later. Thus, as illustrated in graph D of FIG. 4 (which illustrates the read accessing period of stack 110-1), the data at location 112-1 of stack 110-1 addressed during clock period C1 will not be available for use until clock period C4, since readout from stack 110-1 is not completed until near the end of C3. Accordingly, as illustrated by graph E of FIG. 4, in order to increase the speed of overall memory accessing time, read accessing of the portion of the desired data field contained in location 112-2 of the next stack 110-2 is begun in clock period C3. This is accomplished as a result of timing and control circuitry 180 in FIG. 2 again providing a read accessing signal R to memory access controls 111-A and 111-B during C3, it being understood that stack counter 205 will have been advanced to its next count corresponding to stack 110-2 by an advance signal ADV provided at the end of C1. This advance signal ADV is generated by timing and control circuitry 180 in response to the starting bit SB and transfer width TW which for the assumed 23-bit data field of FIG. 3 indicates that a total of three stacks will have to be accessed to read out all of the assumed 23-bit data field. Thus, as illustrated in graphs D and E, the read accessing of stack 110-2 occurs concurrently with the read accessing of stack 110-1, but lagging by one clock period.

In the next occurring clock period C4, accessed stack data from stack 110-1 becomes available, as illustrated in graph G of FIG. 4. Also, as illustrated in graph F of FIG. 4, clock period C4 is additionally used to begin accessing of the next stack 110-3 containing the remainder of the desired data field. Thus, during C4, timing and control circuitry 180 generates another read accessing signal R and, since stack counter 205 will have been advanced at the end of C3 to its next count corresponding to stack 110-3, read accessing of location 112-3 of stack 110-3 will be begun during C3. As will be evident from graphs D, E and F in FIG. 4, the read accessing operations of stack 110-3 will lag those of stack 110-2 by one clock period and those of stack 110-1 by two clock periods.

In the next clock period C5, if a fourth stack access were required, then read accessing of this next stack 110-0 would be begun in C5 in a like manner as described for the previous stacks. However, since this fourth stack access is not required for the particular data field illustrated in FIG. 3, no further stack accessing is initiated during C5.

The data which becomes available from location 112-1 of stack 110-1 during clock period C4 is set up in a first read register 140-A in FIG. 2. Read register 140-A is shared by stacks 110-1 and 110-3, while stacks 110-0 and 110-2 share a second read register 140-B.

Also, during clock period C4 the data from location 112-1 of stack 110-1 which has been set up in read register 140-A is appropriately rotated and masked and loaded into accumulator register 215 of FIG. 2 as illustrated by graph G of FIG. 4. More specificaly, during C4, read register 140-A is selected by read selector 210 in FIG. 2 so as to cause the stack 110-1 contents thereof to be applied to a rotator 141 which, in response to control signals ROT from FIC150, rotates the applied data field portion by an appropriate amount for storage in read data accumulator 215 in accordance with a desired format. While the stack 110-1 data field portion is being applied to accumulator register 215 from rotator 141, mask generator 145, in response to control signals MSK from FIC150, masks out those bits of the rotated data field portion which it is desired not be stored in the accumulator register 215.

As illustrated by graph E of FIG. 4, by the time the next following clock period C5 occurs, stack 110-2 will also have completed its reading operation so that the stack 110-2 data read out therefrom will be present in read register 145-B of FIG. 2. Accordingly, during C5, read selector 210 now selects the output from read register 140-B for rotation, masking and loading in accumulator register 215 (graph G of FIG. 4) in a like manner as described for the data field portion read out from stack 110-1 during C4. The particular rotation and masking provided during C5 again is determined by rotation and masking signals ROT and MSK provided by FIC150 to rotator 141 and mask generator 145, respectively.

It is of significance to note at this point in the description that the provision of a first shared read register 140-A for stacks 110-0 and 110-2 and a second shared read register 140-B for stacks 110-1 and 110-3 permits setting up the data read out from stack 110-2 in register 140-B as soon as it is available without concern as to whether the other read register 140-A is ready to receive such data following its use with stack 110-1 during C4, as would be necessary if only a single read register were provided.

Returning again to the specific example being considered with reference to FIGS. 3 and 4, it will be understood that, during the next following clock period C6, the final portion of the desired data field contained in location 112-3 of stack 110-3 will be present in read register 140-A, and in a similar manner as described for stacks 110-1 and 110-2, will be appropriately rotated, masked and loaded into accumulator register 215.

Figure 5:
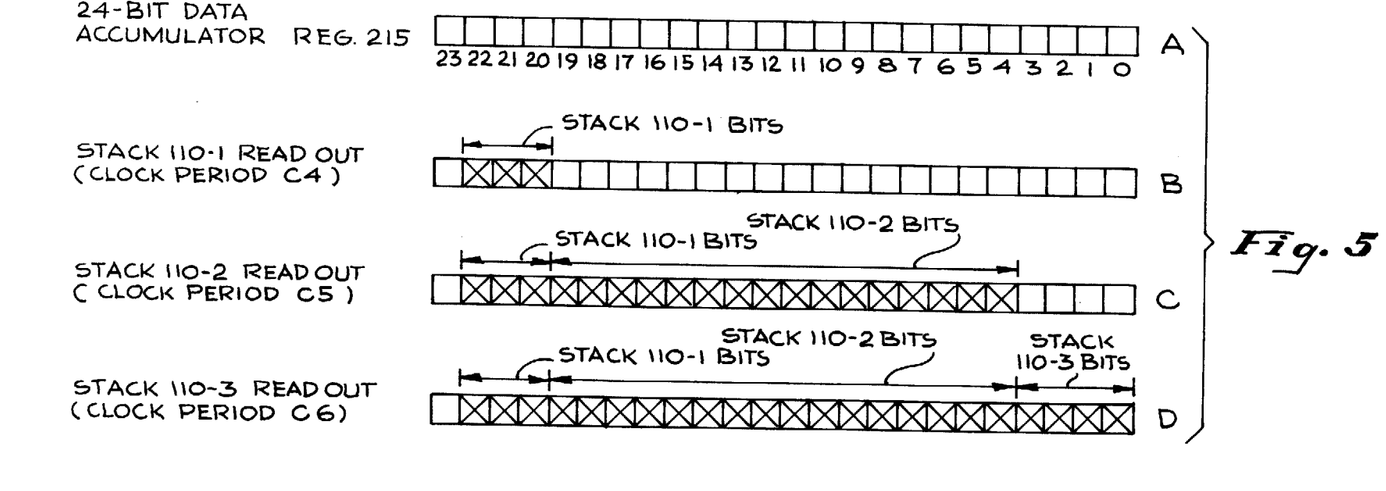
FIG. 5 is a series of diagrams illustrating the operation of the embodiment of FIG. 2 during performance of the read cycle of FIG. 4.

FIG. 5 schematically summarizes the above described serial, multi-phase loading into accumulator register 215 of FIG. 2 of the respective stack portions of the illustrative 23-bit data field of FIG. 3 during clock periods C4, C5 and C6. Diagram A of FIG. 5 illustrates the 24 individual bit storage locations 0–23 which may typically be provided in data accumulator register 215. For the particular exemplary operation being consiered herein, it will be assumed that it is desired that the desired 23-bit data field of FIG. 3 which is to be loaded into the accumulator register 215 after the completion of clock period C6 occupy bit locations 0-22 of register 215 with the most significant bit of the desired data field being stored in bit location 22, as illustrated in diagram D of FIG. 5.

Diagram B of FIG. 5 illustrates the loading during C4 of the first three bits of the desired data field of FIG. 3 contained in location 112-1 of memory stack 110-1 in bit storage locations 22, 21 and 20 of accumulator register 215. Diagram C of FIG. 5 illustrates the loading during C5 of the next sixteen bits of the desired data field of FIG. 3 contained in location 112-2 of memory stack 110-2 in bit storage locations 19-4 of accumulator register 215, and diagram D of FIG. 5 illustrates the loading during C6 of the last four bits of the desired data field of FIG. 3 in bit storage locations 3-0 of data accumulator register 215. Thus, the total 23-bit desired data field of FIG. 3 will be contained in data accumulator register 215 at the completion of clock period C6. As illustrated by graph H of FIG. 4, a transmit signal is accordingly provided during the next clock period C7 for transmitting the contents of the accumulator register 215 to the requestor, thereby terminating the illustrative read operation of FIG. 5.

It will be understood that the rotation and masking provided by rotator 141 and mask generator 145 during each of clock periods C4, C5 and C6 in response to respective control signals ROT and MSK provided by FIC 150 are such as to achieve the storing in accumulator register 215 of each data field portion read out from its respective stack in the manner illustrated in diagrams B, C and D of FIG. 5. For example, during C4 when the data field portion read out from stack 110-1 is being loaded into accumulator register 215, rotator 141 will rotate the sixteen bits read out from location 112-1 of FIG. 3 so that the last three bits of location 112-1 (which are the first three bits of the desired data field) are applied to bit storage locations 23, 22 and 21 of the accumulator register 215, as shown in diagram B of FIG. 5. Also, during C4, mask generator 145 will mask out all bits accessed from location 112-1 of stack 110-1 except for the three bits of the desired data field so that only these three bits are stored in the particular bit locations of accumulator register 215 designated by rotator 141. During clock period C5, rotator 141 and mask generator 145 operate in response to FIC150 so that all sixteen bits of the desired data field portion read out from location 112-2 of stack 110-2 are stored in bit storage locations 19-4 of accumulator register 215, as shown in diagram C of FIG. 5. Lastly, during C6, rotator 141 and mask generator 145 operate in response to FIC150 to cause only the first four of the sixteen bits read out from location 112-2 of stack 110-2 (which are the last four bits of the desired data field) to be stored in bit locations 3-0 of accumulator register 215, as shown in diagram D of FIG. 5.

The foregoing description has thus described the manner in which the embodiment of FIG. 2 is constructed and arranged to perform the typical read cycle illustrated in FIG. 4 with respect to the 23-bit data field illustrated in FIG. 3 and contained in memory stacks 110-1, 110-2 and 110-3 as shown. Next to be considered is the manner in which the embodiment of FIG. 2 is constructed and arranged to perform the typical write cycle illustrated in FIG. 6.

Figure 6:
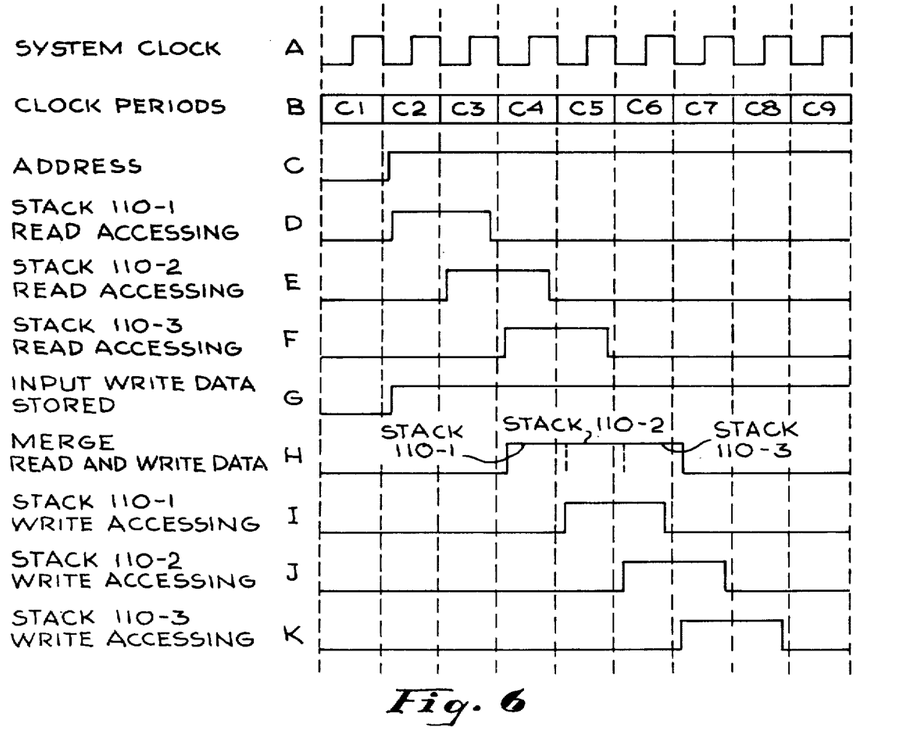
FIG. 6 is a series of timing graphs illustrating a typical write cycle performable by the embodiment of the invention shown in FIG. 2.

As in the preferred embodiment disclosed in the cross-referenced U.S. Pat. No. 3,781,812, a write operation in the embodiment of the present invention illustrated in FIG. 2 is such as to provide for writing into some of the cells of a selected data field contained in one or more memory stacks without affecting the data stored in other cells of the selected data field. Such a write operation is commonly referred to as a read-modify-write operation and a typical example thereof is illustrated in FIG. 6. Briefly, a write cycle such as illustrated in FIG. 6 involves first accessing each of the one or more stacks for reading out the selected data field portions contained therein in the same serial multi-phase manner previously described in connection with the read cycle of FIG. 4. However, for the write cycle, the data read out from each stack during respective clock periods C4, C5 and C6 is not rotated nor applied to accumulator register 215. Instead, the respective portion of the write input data applicable to each stack is appropriately rotated and then merged with the data read out from each stack. Appropriate masking is provided during merging so that only the desired bits of the selected data are modified. The merged result is then written back into the selected location of each stack.

The typical write cycle of FIG. 6 will now be considered in further detail. For this purpose, the same stack location address SLA illustrated in FIG. 3 which was used in describing the typical read cycle of FIG. 4 will also be used in describing the typical write cycle of FIG. 6. The starting bit SB and transfer width TW (i.e., field length) for this write cycle will be that appropriate to the particular write data which is to be written into the memory stacks. The input write data may, for example, comprise 19 bits $W_0$-$W_{18}$ such as illustrated in diagram A of FIG. 7 which shows these 19 input write bits stored in an input write register 148 which receives the input write data. It will be assumed that the purpose of this illustrative write operation is to modify the original field illustrated in FIG. 3 such that these 19 input write bits are stored in locations 112-1, 112-2 and 112-3 of memory stacks 110-1, 110-2 and 110-3, respectively, in the particular manner illustrated in diagram G of FIG. 7 wherein a "W" indicates a write bit and an "X" indicates an original (i.e., unchanged) bit.

As will be evident from a comparison of FIGS. 4 and 6, graphs A through F of the write cycle of FIG. 6 are the same as correspondingly lettered graphs of the read cycle of FIG. 5. This is the case because the same previously described read accessing of stacks 110-1, 110-2 and 110-3 occurs during the write cycle of FIG. 6. Accordingly, the description of the write cycle may proceed directly to graphs G through K of FIG. 6 which are specifically concerned with write-related operations performed during the write cycle.

Graph G in the write cycle of FIG. 6 indicates the storage during clock period C2 of the input write data in input write data register 148 of FIG. 2. Graph H of FIG. 6 indicates the merging of data read out from stacks 110-1, 110-2 and 110-3 during clock periods C4, C5 and C6, respectively, with respective rotated portions of the input write data in input write register 148. Appropriate masking for each stack is provided during merging. The writing of each merged result into its respective stack is initiated during the clock period following merging, as will be evident from graphs I, J, and K of FIG. 6.

More specifically, during C4 the original data read out from location 112-1 of stack 110-1 (FIG. 3) contained in read register 140-A, is applied, not to rotator 141, but directly via lines 147 in FIG. 2 to write merger 151. Also, during C4, the write data in input write register 148 is applied to rotator 141 which, in response to ROT signals from FIC150, appropriately rotates the write data for application to write merger 151 along with the stack 110-1 data from read register 140-A. Merger 151 merges the applied write and read data with masking being provided in accordance with MSK signals provided by FIC150. The merged result is appled to write selector 220 which selects write register 145-A to receive the merged result, since this is the appropriate write register for writing into stacks 110-1 and 110-3. The other write register 145-B is used for writing into stacks 110-0 and 110-2. For the particular example being considered, the contents of write register 145-A at the end of C4 is as illustrated in diagram B of FIG. 7.

During the next clock cycle C5 a write accessing signal W is generated by timing and control circuitry 180 in FIG. 2 so as to initiate writing of the merged write data contained in write register 145-A (diagram B of FIG. 7) into stack 110-1. Signal W is also applied to stack selector 208 in FIG. 2 which, in response to stack counter 205, activates stack 110-1 for initiating a writing operation during C5 (as illustrated by graph I in FIG. 6) at the same time that stack 110-3 is still in the process of performing a reading operation during C5 (graph F). It will be understood that such concurrent operation of stack 110-3 for reading and stack 110-1 for writing as occurs during C5 reduces the overall time required for a memory write operation. The resulting contents of locations 112-1, 112-2 and 112-3 of stacks 110-1, 110-2 and 110-3, respectively, at the completion of writing in stack 110-1 are illustrated in diagram C of FIG. 7 which shows that write bit $W_0$ has been appropriately placed in location 112-1 of stack 110-1 in accordance with the desired final result illustrated in diagram G of FIG. 7. In this regard, it will be understood that the rotation and masking control signals ROT and MSK provided by FIC150 during C4 in response to TW and SB are such as to achieve the writing in stack 110-1 illustrated in diagram C of FIG. 7.

Figure 7:
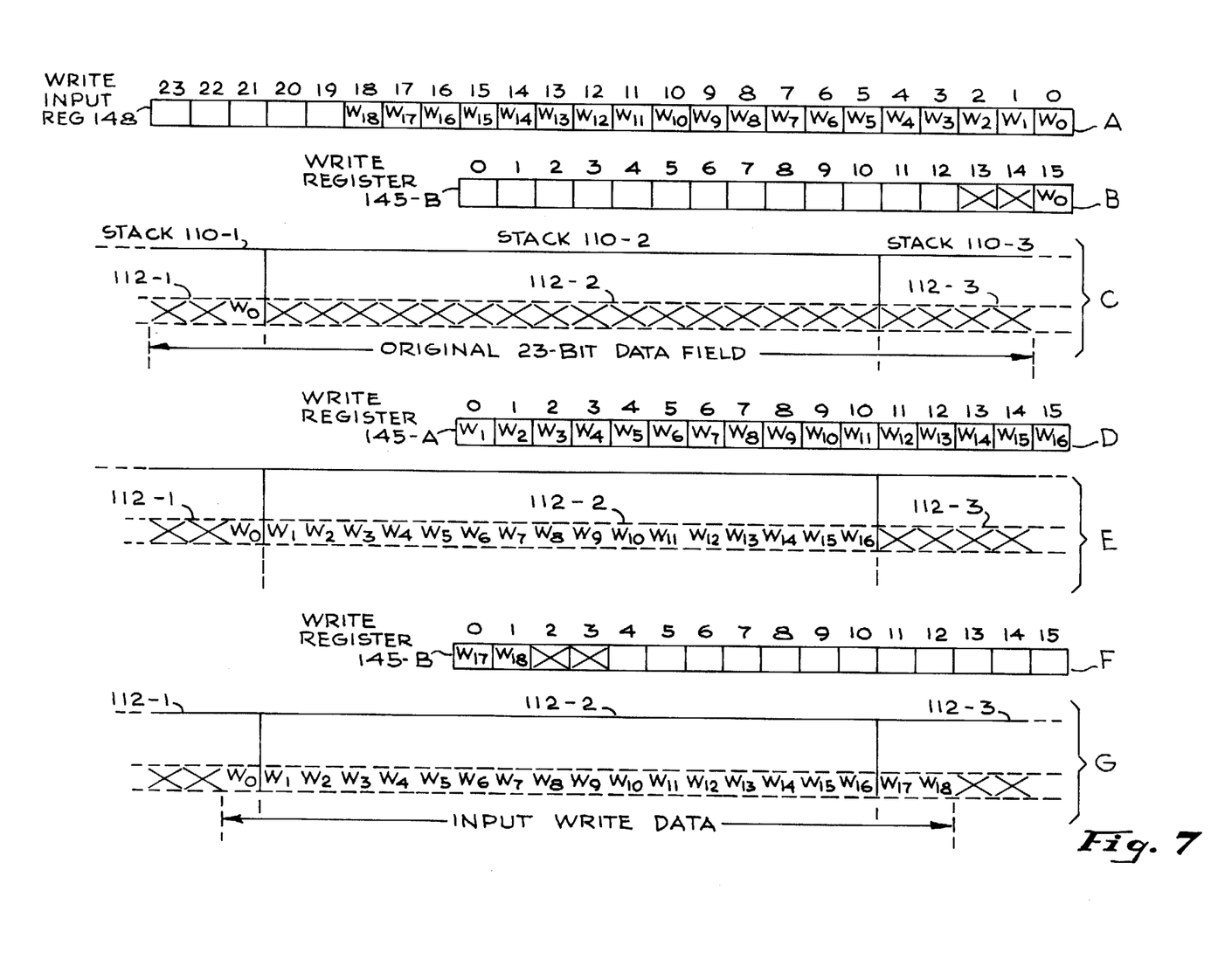
FIG. 7 is a series of diagrams illustrating the operation of the embodiment of FIG. 2 during performance of the write cycle of FIG. 5.

From the foregoing description of the rotation, masking, merging and writing of the appropriate input write data portion into stack 110-1 with reference to FIGS. 6 and 7, it should also be evident how each respective write data portion of the input write data is likewise written into each of stacks 110-2 and 110-3 during subsequent clock periods so as to achieve the final result illustrated in diagram G of FIG. 7. In this regard, it is to be noted that diagram D in FIG. 7 illustrates the storage during C5 of the stack 110-2 write data portion comprised of write bits $W_1$-$W_{16}$ in write register 145-B, while diagram E in FIG. 7 illustrates the resulting contents of stack locations 112-1, 112-2 and 112-3 after completion of writing in stack 110-2. Similarly, diagram F in FIG. 7 illustrates the storage during C6 of the stack 110-3 write data portion comprised of write bits $W_{17}$ and $W_{18}$ in write register 145-A, while diagram G in FIG. 7 illustrates the resulting contents of stack locations 112-1, 112-2 and 112-3 after completion of writing in stack 110-3 which, of course, is the final desired result for the example being assumed.

It will be apparent from the above description of a typical write cycle that the advantages of serial, multiphase accessing are realized during a write cycle as well as during a read cycle. Also, similar advantages are obtained for writing purposes by using the two shared write registers 145-A and 145-B for stacks 110-1, 110-3 and stacks 110-0, 110-2, respectively, as are obtained by the provision of two shared read registers 140-A and 140-B, as described previously herein. Furthermore, with regard to write operations, it will be evident from the description of the illustrative write cycle of FIG. 6 and particularly graphs D-F and I-K thereof, that not only are the write accessing times of the individual stacks overlapped as a result of the serial multi-phase write accessing provided, but also the multi-phase write accessing times of the stacks are advantageously overlapped with the multi-phase read accessing times of the stacks so that the overall read-modify-write operation provided by a write cycle are achieved significantly faster than would otherwise be possible.

The examples of read and write accessing described herein have been such that all of the locations of the stacks required to be accessed had the same common stack location address SLA. Thus, accessing of the stacks did not involve the address modifier 120 in FIG. 2. This is not the case for the example of FIG. 8 which illustrates a selected data field that extends over two stack location addresses SLA-1 and SLA-2. As shown, an initial portion of the selected data field is contained at a first stack location address SLA-1 indicated by locations 112-2 and 112-3 of stacks 110-2 and 110-3, respectively, in FIG. 8. The remaining portion of this selected data field is contained in a next higher stack location address SLA-2 indicated by location 113-0 of stack 110-0.

Figure 8:
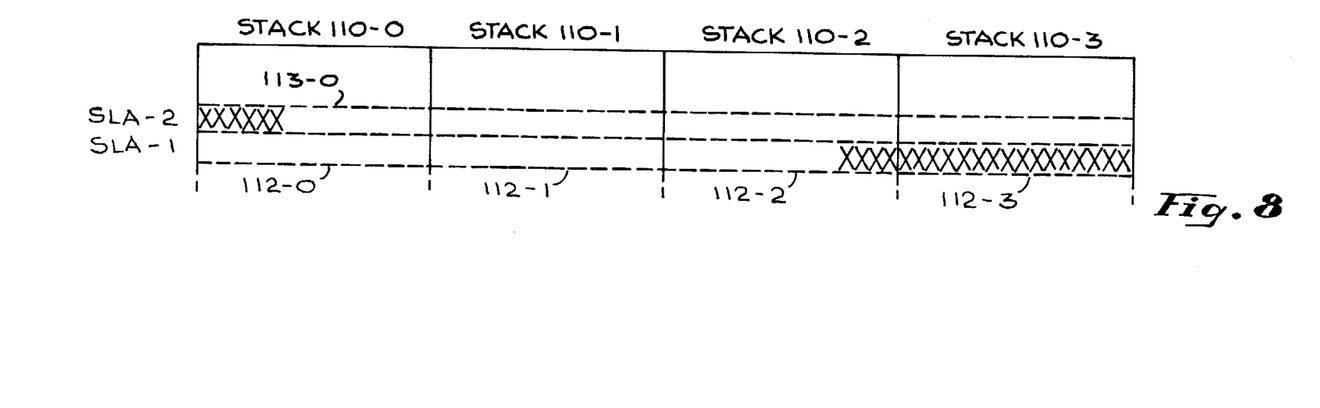
FIG. 8 is a schematic representation illustrating a typical example of how a data field may be stored in the memory 110 of FIG. 2 in a manner so as to extend over a plurality of different memory location addresses and thereby require address modification during the performance of a read or write cycle.

In handling the type of data field illustrated in FIG. 8, address SLA-1 would be initially applied to both memory access controls 111-A and 111-B to provide for serial, multi-phase accessing of stacks 110-2 and 110-3 containing the initial portion of the selected data field in the same manner as for the previously described accessing examples. During the clock period in which accessing of stack 110-3 is begun, the count of stack counter 205 will be at its last count value; however, the values of SB and TW will indicate that at least one more stack is still to be accessed. Timing and control circuitry 180 responds to this condition by providing a control signal MOD to address modifier 120. This control signal MOD causes address modifier 120 to modify the SLA-1 address applied thereto so as to cause the next higher stack location address SLA-2 to be applied to memory access control 111-A when stack 110-0 is activated by the stack counter 205 for accessing during the next clock period, thereby providing for accessing of location 113-0 of stack 110-0 which contains the remaining data field portion. Of course, if the selected data field extended over two different SLA values and field accessing of the stacks were in a reverse direction (as would be indicated by TS), then the modification provided by address modifier 120 would be such as to cause the next lower selected location address to be applied to the appropriate memory access control during the appropriate clock period.

It is to be understood that the present invention is not to be considered as limited to the particular embodiments and examples described herein, since a wide variety of modifications and variations are possible within the scope of the invention. Accordingly, the present invention is to be considered as including all structures and methods coming within the scope of the appended claims.

What is claimed is:

1. In a data processing system, the combination comprising: a memory partitioned into a plurality of individually addressable memory portions, the accessing time of each memory portion requiring at least a plurality of operating cycles of said data processing system;

addressing means responsive to an applied address for initiating accessing of selected locations in a plurality of different memory portions over a plurality of consecutively occurring operating cycles in a manner such that the accessing of only a particular selected one of said memory portions is initiated during an operating cycle;

data accumulation means capable of simultaneously storing data read out from a plurality of said memory portions; and memory output means operative during a read operation for receiving data read out from each addressed selected location of a memory portion as it becomes available and operative during each of a plurality of said operating cycles for storing a predetermined portion of the received data from a selected one of said memory portions in a different designated location of said accumulator means until all of the predetermined portions of the received data read out from the addressed selected locations of said memory are simultaneously stored in said accumulator means.

2. The invention in accordance with claim 1, wherein said memory includes first, second, third and fourth individually addressable memory portions;

wherein said addressing means includes first common accessing means for accessing an addressed selected location in said first and second memory portions, second common accessing means for accessing an addressed selected location in said third and fourth memory portions, and address selection means for selecting which one of said first and second common accessing means is to be operative during an operating cycle; and wherein said memory output means includes first common receiving means for receiving data read out from said first and third memory portions, second common receiving means for receiving data read out from said second and fourth memory portions, and output selection means for selecting which one of said first and second common receiving means is to have a predetermined portion of its received data stored in said data accumulation means during an operating cycle.

3. The invention in accordance with claim 2, wherein said first and second common receiving means are selected during alternate consecutive cycles of an accessing operation.

4. The invention in accordance with claim 3, wherein said first and second common accessing means are selected during alternate consecutive cycles of an accessing operation.

5. The invention in accordance with claim 1, additionally including:

memory input means coupled to said memory and operative during a write operation for receiving input write data, predetermined portions of which are to be written into selected locations of a plurality of said memory portions as determined by said addressing means, said memory input means being operative during an operating cycle to provide for writing a selected respective portion of said input write data into only the particular one of said memory portions whose accessing is initiated during an operating cycle by said addressing means.

6. The invention in accordance with claim 5, wherein said memory includes first, second, third and fourth individually addressable memory portions;

wherein said addressing means includes first common accessing means for accessing an addressed selected location in said first and second memory portions, second common accessing means for accessing an addressed selected location in said third and fourth memory portions, and address selection means for selecting which one of said first and second common accessing means is to be operative during an operating cycle;

wherein said memory output means includes first common receiving means for receiving data read out from said first and third memory portions, second common receiving means for receiving data read out from said second and fourth memory portions, and output selection means for selecting which one of said first and second common receiving means is to have a predetermined portion of its received data stored in said accumulator means during an operating cycle; and wherein said memory input means includes a first common write means for use in writing a selected respective portion of the input write data into one of said first and third memory portions during an operating cycle of a write operation, second common write means for use in writing a selected respective portion of the input write data into one of said second and fourth memory portions during an operating cycle of a write operation, and write selection means for determining which of said first and second common write means is to be operative for writing during a write operating cycle.

7. The invention in accordance with claim 5, wherein said memory input means includes means operative during a write operating cycle for selectively rotating and masking the said selected respective portion of said input write data prior to being applied for writing in its respective memory portion.

8. The invention in accordance with claim 1, wherein said memory output means includes means operative during a read operating cycle for selectively rotating and masking the data read out from a memory portion prior to its storage in said accumulator means.

9. In a data processing system, the combination comprising:

a memory partitioned into a plurality of individually addressable memory portions, the accessing time of each memory portion requiring at least a plurality of operating cycles of said data processing system;

first means responsive to an applied address for initiating read accessing of selected locations in a plurality of different memory portions over a plurality of consecutively occurring operating cycles in a manner such that the read accessing of only a particular selected one of said memory portions is initiated during an operating cycle;

write input means for receiving input write data predetermined portions of which are to be written into said selected locations;

second means responsive to said applied address for initiaing write accessing of said selected locations in a manner such that the write accessing of only a particular selected one of said memory portions is initiated during an operating cycle, and further, in a manner such that write accessing of each memory portion is initiated during the first occurring operating cycle that data is available for use therefrom as a result of the memory portion having been initiated for read accessing during a previous cycle; and memory input means operative during an operating cycle for which write accessing of a selected memory portion is initiated for selectively merging the data read out therefrom with a selected respective portion of the input write data received by said write input means, the merged result being used for writing into the memory portion for which write accessing is initiated during that cycle.

10. The invention in accordance with claim 9, wherein said memory input means includes selectively rotating and masking the respective write data portion prior to merging.

11. A method for use in a data processing system containing a memory partitioned into a plurality of individually addressable memory portions wherein the accessing time of each memory portion requires at least a plurality of operating cycles of said data processing system, and wherein accessing of selected locations in a plurality of memory portions may be required in response to an applied address, said method comprising:

initiaing the accessing of selected locations contained in a plurality of memory portions during consecutively occurring operating cycles in a manner such that accessing of only a particular selected one of said memory portions is initiated during an operating cycle; and accumulating a predetermined selected portion of the data read out from each of said memory portions as it becomes available until the predetermined selected portions from all of the addressed selected locations have been read out and accumulated.

12. The invention in accordance with claim 11, wherein the step of accumulating is such that the predetermined selected portion read out from only one selected memory portion is accumulated during an operating cycle.

13. The invention in accordance with claim 12, wherein said method includes selectively rotating and masking the data read out from a memory portion prior to the step of accumulating.

14. A method for use in a data processing system containing a memory partitioned into a plurality of individually addressable memory portions wherein the accessing time of each memory portion requires at least a plurality of operating cycles of said data processing system, and wherein accessing of selected locations in a plurality of memory portions may be required in response to an applied address, said method comprising:

initiating read accessing of selected locations contained in a plurality of memory portions during consecutively occurring operating cycles in a manner such that accessing of only a particular selected one of said memory portions is initiated during an operating cycle;

initiating write accessing of said selected locations for writing input write data therein in a manner such that the write accessing of only a particular selected one of said memory portions is initiated during an operating cycle, and further, in a manner such that write accessing of each memory portion is initiated during the first occurring operating cycle that data is available for use therefrom as a result of the memory portion having been initiated for read accessing during a previous cycle;

selectively merging the data available for use from a memory portion during an operating cycle with a selected respective portion of said input write data; and writing the merged result into the respective memory portion for which write accessing is initiated during that cycle.

15. The invention in accordance with claim 14, wherein said method includes the step of selectively rotating and masking respective write input data prior to said merging.

* * * * *